J. W. KELLAM.

ADJUSTABLE FLANGE WRENCH.

No. 11,394. Reissued Dec. 5, 1893.

Witnesses:
Charles R. Searle.
M. F. Boyle

Inventor:
Julius W. Kellam
by his attorney
Thomas Drew Stetson

UNITED STATES PATENT OFFICE.

JULIUS W. KELLAM, OF BROOKLYN, NEW YORK, ASSIGNOR TO MINNIE E. KELLAM, OF SAME PLACE.

ADJUSTABLE FLANGE-WRENCH.

SPECIFICATION forming part of Reissued Letters Patent No. 11,394, dated December 5, 1893.

Original No. 487,331, dated December 6, 1892. Application for reissue filed September 23, 1893. Serial No. 486,340.

*To all whom it may concern:*

Be it known that I, JULIUS W. KELLAM, a citizen of the United States, residing at the city of Brooklyn, in the county of Kings and State of New York, have invented a certain new and useful Improvement in Adjustable Flange-Wrenches, of which the following is a specification.

My invention relates to that class of tools or devices employed for screwing on or off the flanges used in gas, water, and steam-pipe fitting, &c.; and the objects of my improvement are to provide a simple effective tool for such purposes which shall be expeditiously, safely and conveniently used, not liable to easy derangement, and at the same time shall have a range of adjustment sufficient to accommodate several sizes of flanges. I attain these objects by means of the mechanism and devices illustrated in the accompanying drawings, in which—

Figure 1:
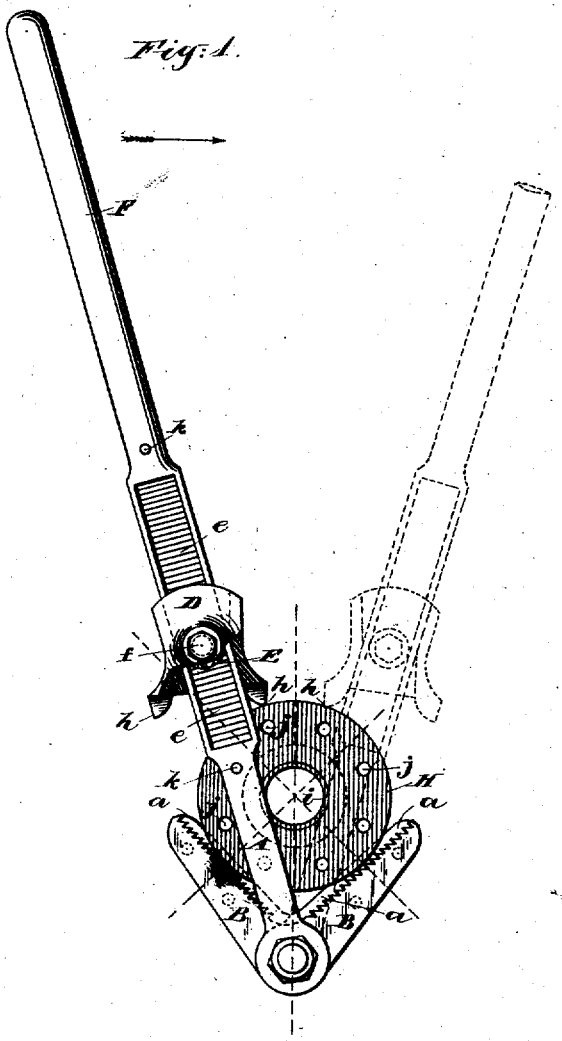
Figure 2:
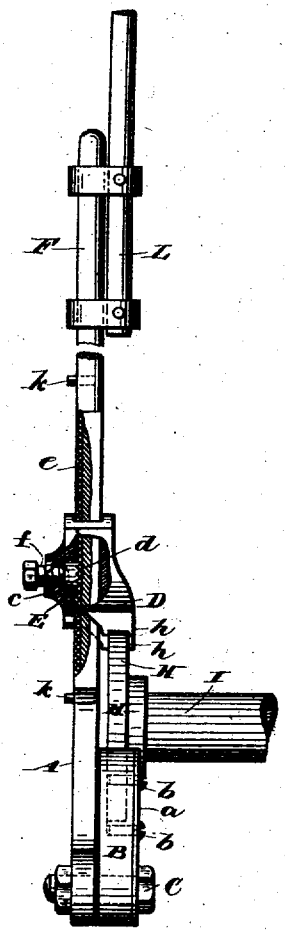

Figure 1 is a front elevation of my invention, partly sectional, showing the construction, application and operation of the same; and Fig. 2 is a side elevation, partly sectional, as the same would appear looking from the right hand to the left of Fig. 1, further showing construction and operation of parts of my invention more in detail, all of which will be more fully described hereinafter.

Like letters indicate corresponding parts throughout the respective figures.

A is lever-bar of iron or other suitable metal.

B is a double right-angled integral swivel-jaw pivoted to the bar A by the bolt C and provided with a lip *a* of corresponding right-angular form secured by rivets or screws *b*, *b*

D is a duo-formed dog mortised vertically in the manner shown and fitted to slide freely up and down the flattened wider portion of the bar A.

E is a disk of hardened steel resting in a socket *c* in the dog, one side of which is roughened, as seen at *d*, for engagement with a similarly roughened surface *e* on one side of the bar, and the rear side of which is in juxtaposition with a set-screw *f*, by which it may be forced against the roughened surface *e* on the bar A to prevent the dog from slipping when the tool is being used.

*h*, *h*, are precisely similar biting edges of the dog arranged in the same plane with the swivel-jaw B. The object of the two biting edges *h*, *h*, will more fully appear hereinafter.

F is the rounded handle end of the lever A.

The dotted outlines of the bar A and the dog D in Fig. 1 shows the manner of adjusting my invention to unscrew a flange.

H is a flange with threaded opening *i* and bolt-holes *j*, *j*, *j*, in the rim, and I is the threaded end of a section of pipe upon which the flange H is screwed.

*k*, *k*, are short pins projecting on one side of the lever-bar A to answer as stops to prevent the dog D from sliding too far upward or downward thereon.

L in Fig. 2 illustrates one means of providing an extension of the lever-handle F. It will be seen that the bar A extends across the face or front of the flange H, forming a straight-line connection between the swivel-jaw B and the dog D. It will also be noticed that opposite faces of the swivel-jaw B are provided with serrations or teeth of precisely similar form but reverse in direction of pitch. This jaw B is made of hardened steel.

The operation of my invention is as follows: An internally-threaded flange is started upon the threaded end of a suitably sized pipe. The workman now places the wrench in the position shown, with the swivel-jaw astride of the rim of the flange and so that the lip *a* is beyond the same, as seen in Fig. 1. He now unscrews the set-screw *f*, which releases the disk E from frictional contact with the roughened surface *e* on the bar and allows the dog to be moved into a position relatively right for engagement with the flange-rim, which is now done. He now tilts the dog D to the position shown in the full-line drawing, Fig. 1, with the right-hand biting edge of the same presented to the flange, and then screws the set-screw *f* down against the disk E hard, which causes the latter to engage firmly with the roughened surface of the bar A and to be rigidly held in position thereon. With the hands he now grasps the lever F and pulls in the direction of the arrow, which causes the biting edge of the dog to take hold of the flange-rim and impinge the flange between the dog and the swivel right-angular jaw B, so that there cannot be any slip, thus screwing the flange upon the pipe. Now by pushing the lever-handle backward again to the position first started from, a new bite is obtained upon the flange-rim and a forward pull then further screws the flange on. During these operations the lip *a*, overhanging the rim, as seen in Fig. 1, keeps the wrench from slipping to one side and off.

When it is required to use the tool for unscrewing a flange, the workman proceeds as before, except that he puts the lever in the position shown by the dotted outlines of the same in Fig. 1 and tilts the dog D in the opposite direction, so that the opposite biting edge of the latter will be in contact with the flange-rim. Then by pulling or pushing the lever-handle in the other direction the flange will be unscrewed.

The straight dotted lines crossing the face of the flange H in different directions will aid those skilled in the art to understand the action of my invention when in use.

I do not limit myself to the use of the particular means of clamping the dog D to the bar A herein shown, as other means may be employed for the purpose without departing from the spirit of my invention; but, Having described my invention, what I do claim as new, and desire to secure by Letters Patent, is—

1. In a flange-wrench, a bar in one rigid piece adapted to extend across the face of a flange, with suitable means attached thereto for engaging the flange-rim on one side and with a dog having a biting edge adapted to automatically engage with such rim on the opposite side of the flange by the act of turning the long arm of the bar in the direction that the flange is to be turned, all arranged for joint operation substantially as herein described.

2. In a flange-wrench, a bar A in a single rigid piece adapted to extend across the face of a flange, in combination with a duo-formed jaw B for taking hold of the flange-rim at two points and with a reversible dog D for taking hold of such rim on the opposite side, the dog having a biting edge adapted to engage reliably with the edge of a round flange in turning it in either direction, all arranged for joint operation substantially as herein specified.

3. In an adjustable flange-wrench, the combination of a double right-angled integral swivel-jaw pivoted to the lower end of a straight lever-bar extended across the face of the flange when applied with a suitable movable adjustable dog carried by said lever-bar, substantially as and for the purposes shown and described.

4. In an adjustable flange-wrench, the combination of a double right-angled integral swivel-jaw pivoted to the lower end of a straight lever-bar extended across the face of the flange when applied with a movable duo-formed adjustable dog and means of clamping the same to said lever-bar, constructed and to operate substantially as and for the purposes shown and described.

5. In an adjustable flange-wrench, the combination of a double right-angled integral swivel-jaw provided with a lip to overhang the rim of the flange, pivoted to the lower end of a lever-bar extended across the face of the flange when applied, with a movable adjustable dog carried by said lever-bar, substantially as and for the purposes shown and described.

6. In an adjustable flange-wrench, the combination of a lever-bar extended across the face of the flange when applied and a right-angled serrated swivel-jaw pivoted to the lower end thereof with an adjustable movable dog provided with biting edges operating in the same plane as the jaw, substantially as and for the purposes shown and described.

7. In an adjustable flange-wrench, the combination of a lever-bar extended across the face of the flange when applied and a right-angled serrated swivel-jaw pivoted to the lower end of the same with an adjustable movable duo-formed reversible dog and means of clamping the latter to said lever-bar, substantially as and for the purposes shown and described.

8. In a new article of manufacture, the herein described adjustable flange-wrench, consisting of the lever-bar A, swivel angular jaw B, secured to the lower end of said lever-bar by pivotal bolt C, said jaw having lip *a*, adjustable movable reversible dog D, mortised to slide upon said lever-bar and provided with biting edges or edge *h*, *h*, clamping disk E, set-screw *f* for securing the same, and stops *k*, *k*, the whole constructed, arranged, and to operate substantially as and for the purposes shown and described.

JULIUS W. KELLAM.

Witnesses:

CHARLES R. SEARLE,

H. A. JOHNSTON.